United States Patent Office 3,272,864
Patented Sept. 13, 1966

3,272,864
PROCESS FOR PREPARING 5-(3-AMINOPROPYLIDENE)-5H-DIBENZO[a,d]CYCLOHEPTENE AND 5H - DIBENZO[a,d]-10,11-DIHYDRO - CYCLOHEPTENE DERIVATIVES
Robert D. Hoffsommer, Jr., and David Taub, Metuchen, and Norman L. Wendler, Summit, N.J., assignors to Merck & Co., Inc., Rahway, N.J., a corporation of New Jersey
No Drawing. Filed Apr. 19, 1962, Ser. No. 188,873
5 Claims. (Cl. 260—570.8)

This invention relates to a novel method for making derivatives of dibenzocycloheptenes and, more particularly, the invention relates to a method of making 5H-dibenzo[a,d]cycloheptenes and 5H-dibenzo[a,d]-10,11-dihydrocycloheptenes which are substituted at the 5-carbon atom with an aminopropylidene radical. The invention also includes the synthesis of intermediates used for obtaining these products.

The compounds of the invention are useful in the treatment of mental health conditions as they are antidepressants and serve as mood elevators or psychic energizers. For this purpose the daily dosage is within the range of 5 mg. to 250 mg., preferably taken in divided amounts over the day. The compounds are preferably administered in the form of their acid salts and these salts are included in the scope of this invention.

The compounds formed by the method of the invention may be represented by the general formula:

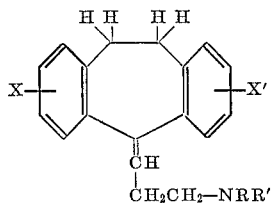

and

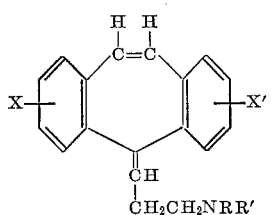

wherein X and X' may be similar or dissimilar and are selected from the group consisting of hydrogen, lower alkyl, lower alkoxy, lower alkenyl, haloloweralkyl, phenyl or substituted phenyl, an acyl group having up to 4 carbon atoms, haloacyl having up to 4 carbon atoms, amino, loweralkylamino, diloweralkylamino, acylamine, having up to 4 carbon atoms, haloacylamino having up to 4 carbon atoms, a loweralkylsulfonylamino, sulfamyl, lower-alkylsulfonyl, haloloweralkylsulfonyl, sulfamyl, lower-alkylsulfonyl, diloweralkylsulfamyl; more than one of these substituents may be on each benzenoid ring.

R and R' are selected from the group consisting of hydrogen, lower alkyl radicals, lower alkenyl, cyclolower-alkyl, phenyl, benzyl and lower alkyl radicals linked together through an atom selected from the group consisting of carbon, nitrogen and oxygen to form a heterocyclic ring selected from the group consisting of 1-piperidyl, 1-pyrrolidyl, 4-morpholinyl and 1-loweralkyl-4-piperazinyl.

The method of the present invention may be illustrated schematically by the following flowsheet in which the dotted line indicates that the compound may be saturated (10,11-dihydro) or unsaturated at the 10,11 positions and X,X', R and R' are as previously defined:

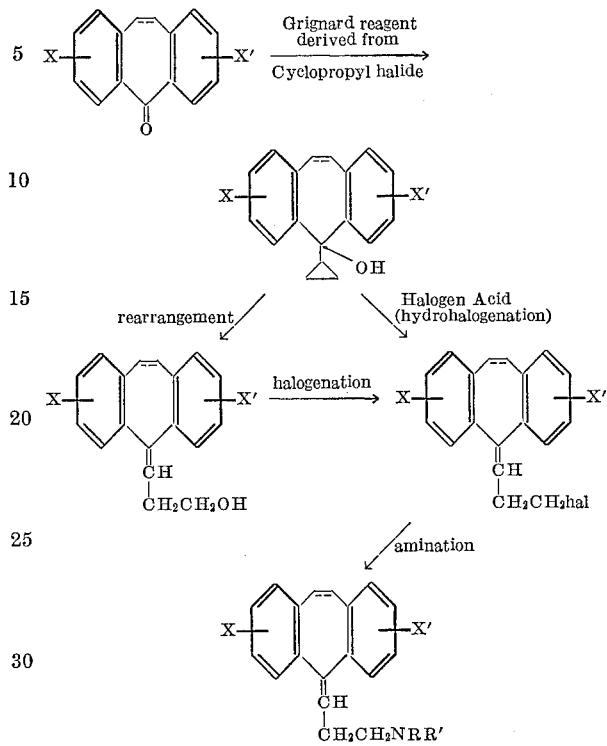

The method of the present invention begins with the known ketone which may be prepared by using the process described by A. C. Cope et al., entitled, "Cyclic Poylolefins, XV, 1-Methylene-2,3,6,7-Dibenzocycloheptatriene," appearing in J.A.C.S., 73, 1673, 1678 (1951); or the starting compounds, and particularly those having substituents on the benzene rings, may be made by the following teachings of T.W. Campbell et al., in an article entitled "Synthesis of 2.-Acetamido-2,3:6,7-Dibenzotropilidene and 2-Acetamido-9,9-Dimethylfluorene," appearing in Helv. Chim. Acta, 36, 1489 to 1499 (1953).

As shown in the flow sheet above, the first step in the method of the present invention involves the condensation of a 5H-dibenzo[a,d]cycloheptene-5-one with a Grignard reagent derived from a cyclopropylhalide to form the corresponding cyclopropyl carbinol, e.g. 5-cyclopropyl-5-hydroxy-5H-dibenzo[a,d]10,11-dihydrocycloheptene. In a typical run cyclopropylbromide in tetrahydrofuran is added dropwise with stirring to a quantity of magnesium in dry tetrahydrofuran to form cyclopropylmagnesium bromide. Then the ketone is added to the cyclopropylmagnesium bromide and the reaction mixture is refluxed for a suitable period of time to produce the cyclopropylcarbinol intermediate.

The next step in the method involves the rearrangement of the cyclopropylcarbinol to produce the corresponding γ-hydroxy-propenylcycloheptene, e.g. 5-(γ-hydroxypropylidene) - 5H - dibenzo[a,d]10,11-dihydrocycloheptene. The γ-hydroxypropenylcycloheptane is then treated with a halogen agent to give the corresponding γ-halopropenylcycloheptene derivative, e.g. 5-(γ-bromopropylidene)-5H-dibenzo[a,d]10,11-dihydrocycloheptene. The rearrangement and halogenation steps described above may be carried out simultaneously or separately. By treatment of the cyclopropylcarbinol with a hydrogen halide in acetic acid solution, the corresponding γ-halopropenylcycloheptene may be formed directly in one step. The corresponding iodo derivative, when desired, preferably is formed from the chloro or bromo derivative by reacting the latter with sodium iodide in acetone under reflux.

On the other hand, the γ-hydroxypropenylcycloheptane derivative itself may be isolated by treatment of the cyclopropylcarbinol with an acid that is not a halogen acid. Dilute perchloric acid in dioxane is a suitable reagent, although other acids including sulfuric acid, phosphoric acid and p-toluenesulfonic acid may be used as well. Thereafter, the γ-hydroxy compound may be converted to the corresponding γ-halo propenylcycloheptane by reaction with an appropriate halogenation agent, suitably thionyl chloride or phosphorus trichloride, although others may be used as well.

Finally the γ-halopropenylcycloheptane compound is converted to the desired aminopropylidene derivative by a process of amination. The amination may proceed by direct reaction of the halogen compound with an amine whereby the desired aminopropylidene compound is subsequently isolated as the hydrochloride. Alternatively, the desired amine derivative may be prepared by an amination reaction using potassium phthalimide followed by hydrazinolysis.

The examples which follow will more specifically illustrate the process of the present invention:

EXAMPLE 1

*5-cyclopropyl-5-hydroxy-5H-dibenzo[a,d]-10,11-dihydrocycloheptene*

To a 125 ml., 3-neck flask (flamed out and cooled under dry nitrogen) equipped with a stirrer, addition funnel, and ether-type condenser are charged 1.7 g. (0.070 mole) of clean magnesium turnings and 15 ml. of dry tetrahydrofuran (THF). 8.5 g. (0.0702 mole) of cyclopropylbromide in 15 ml. of dry THF is added, dropwise with stirring, at a rate sufficient to maintain a gentle reflux. Gentle warming and stirring for about 30 minutes is needed to start the reaction, after which no external heat is required. Stirring and refluxing is continued until all the metal is gone. The reaction mixture is then cooled below the point of reflux, but not so low as to cause the Grignard reagent to precipitate, and 7.3 g. (0.0351 mole) of 5H-dibenzo-[a,d]-10,11-dihydrocycloheptene-5-one in 20 ml. of dry THF is added with stirring in 15 minutes. The reaction mixture is stirred and refluxed for 6 hours, with 0.5 ml. aliquots withdrawn and worked up each hour for thin layer chromatography (TLC) to follow the reaction. TLC indicates that the reaction is complete in 1 hour, indeed all of the probes spontaneously crystallize upon standing. The reaction mixture (6 hours) is chilled in an ice bath and treated with 45 ml. of saturated ammonium chloride solution. The layers are separated and just enough water is added to dissolve the solid salts in the aqueous layer. The latter is extracted with 2 x 25 ml. of ether. The combined organic layers are washed with 25 ml. of saturated salt solution, dried over magnesium sulfate and taken to dryness in vacuo to yield 9.88 g. of a yellow-orange oil. Treatment of this oil with charcoal, in ether, and crystallization from petroleum ether yields 5.49 g. (62.5%) of crude crystalline cyclopropyl carbinol, single spot by TLC. Further recrystallization yields material melting at 72.8–73.8° C.;

$\lambda_{max.}^{MeOH}$ 2630, E 1% cm. 24

*Analysis.*—Calculated for $C_{18}H_{18}O$: C, 86.36; H, 7.24. Found: C, 86.43; H, 7.40.

EXAMPLE 2

*5-cyclopropyl-5-hydroxy-5H-dibenzo[a,d]-cycloheptene*

Following the procedure described in detail in Example 1 and using equivalent quantities of 5H-dibenzo[a,d]cycloheptene-5-one there is produced the corresponding 5-cyclopropyl-5-hydroxy-5H-dibenzo[a,d]-cycloheptene.

EXAMPLE 3

*5-(γ-bromopropylidene-5H-dibenzo[a,d]-10,11-dihydrocycloheptene*

5-cyclopropyl-5-hydroxy-5H-dibenzo[a,d]-10,11 - dihydrocycloheptene (1.3 g., 5.19 millimoles) is dissolved in 20 ml. of glacial acetic acid in a 100 ml. flask and the solution is chilled at 10° C. HBr/acetic acid (10 ml. of a 15% solution) is added with stirring and the reaction mixture is stirred at 10–15° C. for 0.5 hour. The reaction mixture is then filtered cold and the crystalline product is air dried to yield 730 ml. (45%) of first crop bromide melting 71.0–71.8° C. The filtrate is chilled and diluted with 40 ml. of water to yield 880 mg. of crude second crop which, on recrystallization from petroleum-ether containing a small amount of ether, yields 780 mg. of crystalline material melting 69.2–71.6° C. Total crystalline product amounts to 1.51 g. (92.5%) which exhibits the following properties:

$\lambda_{max.}^{MeOH}$ 2400, E 1% cm. 565; $\lambda_{max.}^{CHCl_3}$ 3.27, 3.35, 3.43, 6.1, 6.21 and 6.34μ

*Analysis.*—Calculated for $C_{13}H_{17}Br$: C, 69.01: H, 5.47; Br, 25.51. Found: C, 68.95; H, 5.15; Br, 25.57.

EXAMPLE 4

*5-(γ-bromopropylidene-5H-dibenzo[a,d]-cycloheptene*

Following the procedure described in detail in Example 3 and using equivalent quantities of 5-cyclopropyl-5-hydroxy-5H-dibenzo[a,d]-cycloheptene there is produced the corresponding 5-(γ-bromopropylidene-5H - dibenzo [a,d]-cycloheptene.

EXAMPLE 5

*5-(γ-chloropropylidene)-5H-dibenzo[a,d]-10,11-dihydrocycloheptene*

5-cyclopropyl-5-hydroxy-5H-dibenzo[a,d]-10,11 - dihydrocycloheptene (100 ml., 0.4 millimole) is dissolved in 5 ml. of glacial acetic acid in a 25 ml. flask with a magnetic stirring bar, and the solution is cooled to 10° C. HCl/acetic acid (1 ml. of a 15% solution) is added with stirring and the reaction mixture is stirred at 10–15° C. for 3 hours. Aliquots are withdrawn at intervals for spotting on thin-layer chromatography plates, indicating that the reaction is complete within 15 minutes. The reaction mixture is concentrated to dryness in vacuo at room temperature and flushed 3 times with benzene. The crystalline residue is treated with charcoal and recrystallized from ether/petroleum ether to yield a crystalline product with the following properties: M.P. 83–84° C.;

$\lambda_{Max.}^{MeOH}$ 2400, E 1% cm. 516

*Analysis.*—Calculated for $C_{18}H_{17}Cl$: C, 80.43; H, 6.37; Cl, 13.19. Found: C, 79.98; H, 6.50; Cl, 13.10.

EXAMPLE 6

*5-(γ-chloropropylidene)-5H-dibenzo[a,d]-cycloheptene*

Following the procedure described in detail in Example 5 and using equivalent quantities of 5-cyclopropyl-5-hydroxy-5H-dibenzo[a,d]-cycloheptene there is produced the corresponding 5-(γ-chloropropylidene)-5H-dibenzo[a,d]-cycloheptene.

EXAMPLE 7

*5-(γ-iodopropylidene)-5H-dibenzo[a,d]-10,11-dihydrocycloheptene*

A solution of 200 mg. (0.636 millimole) of 5-(γ-bromopropylidene)-5H-dibenzo[a,d] - 10,11 - dihydrocycloheptene and 360 mg. (2.4 millimoles) of sodium iodide in 10 ml. of acetone is refluxed for 18 hours. The reaction mixture is then cooled to room temperature and filtered to remove the precipitated NaBr, which amounts to 60 mg. (91.5% of theory). The filtrate is concentrated to dryness and the residue is triturated with water to yield an oily mixture. This mixture is extracted with ether, the ether solution is washed with saturated salt solution, dried over magnesium sulfate, treated with charcoal, filtered through Celite and crystallization attempted from ether/pet. ether. The oil crystallizes after standing overnight to yield 210 mg. (93% yield) of material, M.P. 54–60° C. This product is recrystallized from pet. ether to give 170 mg. of material, M.P. 56.2–59° C., which has $\lambda_{max.}^{MeOH}$ 2425, E 1% cm. 410

Analysis.—Calculated for $C_{18}H_1)I$: C, 60.01; H, 4.75; I, 35.23. Found: C, 59.87; H, 4.70; I, 35.55.

EXAMPLE 8

*5-(γ-iodopropylidene)-5H-dibenzo[a,d]-cycloheptene*

Following the procedure described in detail in Example 7 and using equivalent quantities of 5-(γ-bromopropylidene)-5H-dibenzo[a,d]-cycloheptene there is produced the corresponding 5-(γ-iodopropylidene)-5H - dibenzo [a,d]- cycloheptene.

EXAMPLE 9

*5-(γ-hydroxypropylidene)-5H-dibenzo[a,d]-10,11-dihydrocycloheptene*

500 mg. of 5-cyclopropyl-5-hydroxy-5H-dibenzo[a,d]- 10,11-dihydrocycloheptene in 15 ml. of dioxane is treated with 9 ml. of 2 M perchloric acid, at room temperature, for a total of 6 hours. Samples for TLC are withdrawn after 1, 3 and 6 hours, and show the reaction to be complete and clean at 1 hour, with no further change after 6 hours. Work-up of the reaction mixture yields a crude solid which after recrystallization, yields 320 mg. (64% yield) of alcohol having the following characteristics; M.P. 89–90.2° C.;

$\lambda_{max.}^{MeOH}$ 2375, E 1% cm. 554; $\lambda_{max.}^{CHCl_3}$ 2.73, 2.9, 3.25, 3.21, 6.2, 6.34 and 9.6μ.

Calculated for $C_{18}H_{18}O$: C, 86.36; H, 7.24. Found: C, 86.44; H, 7.16.

EXAMPLE 10

*5-(γ-hydroxypropylidene)-5H-dibenzo[a,d]-cycloheptene*

Following the procedure described in detail in Example 9 and using equivalent quantities of 5-cyclopropyl-5-hydroxy - 5H - dibenzo[a,d]-cycloheptene there is produced the corresponding 5-(γ-hydroxypropylidene)-5H-dibenzo [a,d]-cycloheptene.

EXAMPLE 11

*5-(γ-chloropropylidene)-5H-dibenzo[a,d]-10,11 dihydrocycloheptene*

Treatment of a solution of 50 mg. of 5-(γ-hydroxypropylidene)-5H-dibenzo[a,d]-10,11-dihydrocycloheptene in 3 ml. of dry benzene containing one drop of pyridine with 65 mg. of thionylchloride in 2 ml. of dry benzene and refluxing for 3 hours on a steam bath yields a crystalline product, M.P. 78–79° C. which, by TLC and mixed M.P. (78–81° C.) was shown to be identical with the compound obtained from treatment of 5-hydroxy-5-cyclopropyl-5H-dibenzo[a,d] - 10,11-dihydrocycloheptene with HCl/acetic acid.

EXAMPLE 12

*5-(γ-chloropropylidene)-5H-dibenzo[a,d]-cycloheptene*

Following the procedure described in detail in Example 11 and using equivalent quantities of 5-(γ-hydroxypropylidene)-5H-dibenzo[a,d]-cycloheptene there is produced the corresponding 5-(γ-chloropropylidene)-5H-dibenzo[a,d]-cycloheptene.

EXAMPLE 13

*5-(γ-dimethylaminopropylidene)-5H-dibenzo[a,d]- 10,11-dihydrocycloheptene HCl*

A solution of 100 mg. (0.372 millimole) of 5-(γ-chloropropylidene)-5H-dibenzo[a,d] - 10,11 - dihydrocycloheptene in 1 ml. of benzene in a thick-walled Pyrex tube is saturated with dimethylamine at 10° C. The tube is sealed, allowed to stand at 95° C. for 18 hours, then cooled and opened. The benzene solution is washed successively with 5% potassium bicarbonate, water and saturated salt solution, dried over magnesium sulfate, and taken to dryness in vacuo. The residual oil is dissolved in ether and treated with ether saturated with HCl. The resulting mixture of oil and ether is blown dry to remove the excess HCl, and the residue upon trituration with ether yields crystalline 5-(γ-dimethylaminopropylidene)- 5H-dibenzo[a,d] - 10,11 - dihydrocycloheptene material, M.P. 190–192° C.

$\lambda_{max.}^{MeOH}$ 2400, E 1% cm. 437

Analysis.—Calculated for $C_{20}H_{24}NCl$: C, 76.53; H, 7.71; N, 4.46. Found: C, 76.24; H, 7.63; N, 4.58.

EXAMPLE 14

*5-(γ-dimethylaminopropylidene)-5H-dibenzo[a,d]- cycloheptene HCl*

Following the procedure described in detail in Example 13 and using equivalent quantities of 5-(γ-chloropropylidene)-5H-dibenzo[a,d]-cycloheptene there is produced the corresponding 5 - (γ - dimethylaminopropylidene)-5H-dibenzo [a,d]-cycloheptene HCl.

EXAMPLE 15

*5-(γ-methylaminopropylidene-5H-dibenzo[a,d]- 10,11-dihydrocycloheptene HCl*

A solution of 100 mg. (0.372 millimole) of 5-(γ-chloropropylidene)-5H-dibenzo[a,d] - 10,11 - dihydrocycloheptene in 1.5 ml. of benzene is saturated with monomethylamine at 10° C. in a thick-walled Pyrex tube. The tube is sealed, allowed to stand at 95° C. for 18 hours, then cooled and opened. The benzene solution is washed successively with 5% potassium bicarbonate, water and saturated salt solution, dried over magnesium sulfate, and taken to dryness in vacuo. The residual oil is dissolved in 3 ml. of ether and treated with 3 ml. of ether saturated with HCl. The resulting mixture of oil and ether is blown dry to remove the excess HCl. Trituration of the residue in ether yields a crystalline crude, M.P. 200–210° C., which after recrystallization from ether-ethanol, produces crystals, M.P. 213–215° C. Analysis.—Calculated for $C_{19}H_{22}NCl$: C, 76.10; H, 7.39; N, 4.67. Found: C, 75.61; H, 7.05; N, 4.38.

EXAMPLE 16

*5-(γ-methylaminopropylidene)-5H-dibenzo[a,d]- cycloheptene HCl*

Following the procedure described in detail in Example 15 and using equivalent quantities of 5-(γ-chloropropylidene)-5H-dibenzo[a,d]-cycloheptene there is produced the corresponding 5-(γ-methylaminopropylidene)-5H-dibenzo[a,d]-cycloheptene HCl.

EXAMPLE 17

*Substituted 5-cyclopropyl-5-hydroxy-5H-dibenzo[a,d]- 10,11-dihydrocycloheptenes*

Following the procedure described in detail in the above Examples 1 through 16 and using equivalent quantities of the corresponding 5H-dibenzo[a,d]-10,11-dihydrocycloheptene-5-ones and 5H - dibenzo - cycloheptene-5-ones substituted with the nuclear substituents X and X' given above there are produced the corresponding substituted 5-cyclopropyl-5-hydroxy - 5H-dibenzo[a,d] - 10,11 - dihydrocycloheptenes and substituted 5-cyclopropyl-5-hydroxy-5H-dibenzo[a,d]-cycloheptenes.

EXAMPLE 18

*Substituted 5-cyclopropyl-5-hydroxy-5H-dibenzo[a,d]-cycloheptenes*

Following the procedure described in detail in the above Examples 1 through 17 and using equivalent quantities of the corresponding 5H-dibenzo[a,d]-cycloheptene-5-ones and 5H-dibenzo[a,d]-cycloheptene-5-ones substituted with the nuclear substituents X and X' given above in the general formula there are produced compounds corresponding to the aminopropylidene compounds formed in the above examples.

EXAMPLE 19

*5-(γ-aminopropylidene) - 5H - dibenzo[a,d]-10,11-dihydrocycloheptene HCl*

A solution of 1.0 g. (3.19 millimole) of 5-(γ-bromopropylidene) - 5H - dibenzo[a,d]-10,11-dihydrocycloheptene in 25 ml. of absolute ethanol in a Carius tube is saturated with anhydrous ammonia at 0° C. The tube is sealed, allowed to stand at 100° C. for 18 hours, then cooled and opened. The clear, light-tan ethanol solution is taken to dryness in vacuo, the residue treated with charcoal, in ethanol, filtered and again taken to dryness in vacuo. Trituration of the residue with benzene yielded 900 mg. of crystalline material. 500 mg. of this material is dissolved in 50 ml. of hot water, the resulting cloudy solution filtered, the filtrate cooled and treated with 5% potassium bicarbonate solution (neutralization followed with a pH meter—complete at pH 9). The aqueous mixture is extracted with 3 x 20 ml. of ethyl acetate, the combined extracts dried over magnesium sulfate and taken to dryness in vacuo. The residual oil is dissolved in 18 ml. of ether and treated with 8 ml. of ether saturated with HCl to form a white precipitate. This mixture is blown to dryness with nitrogen to remove the excess HCl, the residue triturated with ether and chilled to yield 230 mg. of crude solid. Recrystallization from ethanol yields 120 mg. of crystalline product with M.P. 258–263° C. and $$\lambda_{max}^{MeOH}\ 2390,\ E\ 1\%\ cm.\ 480.$$

*Analysis.*—Calculated for $C_{18}H_{20}NCl$: C, 75.65; H, 7.05; Cl, 12.40. Found: C, 75.35; H, 7.33; Cl, 12.19.

EXAMPLE 20

*5-(γ-aminopropylidene) - 5H - dibenzo[a,d]-cycloheptene HCl*

Following the procedure described in detail in Example 19 and using equivalent quantities of 5-(γ-bromopropylidene)-5H-dibenzo[a,d] cycloheptene there is produced the corresponding 5-(γ-aminopropylidene)-5H-dibenzo[a,d]-cycloheptene HCl.

We claim:

1. A method of introducing a γ-aminopropylidene moiety at the 5 position of a 5H-dibenzo[a,d]-10,11-dihydrocycloheptene or a 5H-dibenzo[a,d]cycloheptene, which comprises reacting a compound selected from the group consisting of a 5H-dibenzo[a,d-]-10,11-dihydrocycloheptene-5-one and a 5H-dibenzo[a,d]cycloheptene-5-one with a Grignard reagent derived from a cyclopropylhalide to produce the corresponding intermediate selected from the group consisting of 5-cyclopropyl-5-hydroxy-5H-dibenzo[a,d] - 10,11 - dihydrocycloheptene and 5-cyclopropyl - 5 - hydroxy-5H-dibenzo[a,d]cycloheptene, rearranging said intermediate to form the corresponding 5-(γ-hydroxypropylidene) - 5H - dibenzo[a,d]-10,11-dihydrocycloheptene and 5-(γ-hydroxypropylidene) - 5H - dibenzo[a,d]cycloheptene, halogenating said derivative to the corresponding 5-(γ-halopropylidene)-5H-dibenzo[a,d]-10,11-dihydrocycloheptene and 5-(γ-halopropylidene) - 5H - dibenzo[a,d]cycloheptene, and then aminating said halogen derivative to the amine compound.

2. A method of introducing a γ-aminopropylidene moiety at the 5 position of a 5H-dibenzo[a,d]-10,11-dihydrocycloheptene which comprises reacting a 5H-dibenzo[a,d]-10,11-dihydrocycloheptene - 5 - one with a Grignard reagent derived from a cyclopropylhalide to produce the corresponding intermediate, 5-cyclopropyl-5-hydroxy - 5H - dibenzo[a,d]-10,11-dihydrocycloheptene, rearranging said intermediate to form the corresponding 5-(γ-hydroxypropylidene) - 5H - dibenzo[a,d]-10,11-dihydrocycloheptene, halogenating said derivative to the corresponding 5-(γ-halopropylidene)-5H-dibenzo[a,d]-10,11-dihydrocycloheptene, and then aminating said halogen derivative to the amine compound.

3. A method of introducing a γ-aminopropylidene moiety at the 5 position of a 5H-dibenzo[a,d]cycloheptene which comprises reacting a 5H-dibenzo[a,d]cycloheptene-5-one with a Grignard reagent derived from a cyclopropylhalide to produce the corresponding intermediate, 5-cyclopropyl-5-hydroxy-5H-dibenzo[a,d]cycloheptene, rearranging said intermediate to form the corresponding 5-(γ-hydroxypropylidene) - 5H - dibenzo[a,d]cycloheptene, halogenating said derivative to the corresponding 5-(γ-halopropylidene)-5H-dibenzo[a,d]cycloheptene, and then aminating said halogen derivative to the amine compound.

4. The method of claim 1 wherein said γ-aminopropylidene moiety is γ-dimethylaminopropylidene and said halogen derivative is aminated with dimethylamine.

5. The method of claim 1 wherein said γ-aminopropylidene moiety is γ-methylaminopropylidene and said halogen derivative is aminated with monomethylamine.

References Cited by the Examiner

UNITED STATES PATENTS

| | | | |
|---|---|---|---|
| 2,385,789 | 10/1945 | Bruson | 260—618 |
| 2,541,342 | 2/1951 | Cusic | 260—570.8 X |
| 2,599,497 | 6/1952 | Stoll et al. | 260—570.8 |
| 2,647,929 | 8/1953 | Heinzelmann | 260—570.8 |
| 2,886,604 | 5/1959 | Schmerling | 260—649 |
| 2,908,720 | 10/1959 | Linn | 260—618 |
| 2,965,639 | 12/1960 | Schindler et al. | |
| 2,978,517 | 4/1961 | Schiller | 260—649 |

FOREIGN PATENTS 858,187  1/1961  Great Britain.

OTHER REFERENCES

Favorskaya et al.: "Zhur. Obshchei Khim," vol. 23, pages 2009–20 (1953).

CHARLES B. PARKER, *Primary Examiner.*

LEON ZITVER, JOSEPH P. BRUST, *Examiners.*

M. B. ROBERTO, R. V. HINES, *Assistant Examiners.*

UNITED STATES PATENT OFFICE
CERTIFICATE OF CORRECTION

Patent No. 3,272,864                          September 13, 1966

Robert D. Hoffsommer, Jr., et al.

It is hereby certified that error appears in the above numbered patent requiring correction and that the said Letters Patent should read as corrected below.

Column 2, line 43, for "2." read -- $2'$ --; column 4, line 8, for "at" read -- to --; line 24, for "$C_{13}$" read -- $C_{18}$ --; column 5, line 11, for "$H_1$)" read -- $H_{17}$ --; line 36, for "3.21" read -- 3.31 --.

Signed and sealed this 24th day of October 1967.

(SEAL)
Attest:

Edward M. Fletcher, Jr.

Attesting Officer

EDWARD J. BRENNER

Commissioner of Patents